US008895467B2

(12) United States Patent
Sun et al.

(10) Patent No.: US 8,895,467 B2
(45) Date of Patent: Nov. 25, 2014

(54) AG/MNYOX/C CATALYST, PREPARATION AND APPLICATION THEREOF

(75) Inventors: Gongquan Sun, Dalian (CN); Qiwen Tang, Dalian (CN); Luhua Jiang, Dalian (CN); Suli Wang, Dalian (CN)

(73) Assignee: Dalian Institute of Chemical Physics, Chinese Academy of Sciences, Dalian (CN)

(*) Notice: Subject to any disclaimer, the term of this patent is extended or adjusted under 35 U.S.C. 154(b) by 0 days.

(21) Appl. No.: 13/989,810

(22) PCT Filed: Nov. 30, 2010

(86) PCT No.: PCT/CN2010/079294
§ 371 (c)(1),
(2), (4) Date: May 27, 2013

(87) PCT Pub. No.: WO2012/071709
PCT Pub. Date: Jun. 7, 2012

(65) Prior Publication Data
US 2013/0252806 A1 Sep. 26, 2013

(30) Foreign Application Priority Data
Nov. 29, 2010 (CN) .......................... 2010 1 0563788

(51) Int. Cl.
*B01J 21/18* (2006.01)
*B01J 23/00* (2006.01)
(Continued)

(52) U.S. Cl.
CPC ........... *B01J 23/688* (2013.01); *C25B 11/0484* (2013.01); *H01M 4/9016* (2013.01); *H01M 4/9083* (2013.01); *H01M 4/9041* (2013.01); *H01M 8/083* (2013.01); *H01M 12/06* (2013.01); *Y02E 60/50* (2013.01)
USPC ............ 502/184; 502/324; 429/219; 429/224

(58) Field of Classification Search
USPC ........................... 502/184, 324; 429/219, 224
See application file for complete search history.

(56) References Cited

U.S. PATENT DOCUMENTS 2,657,182 A * 10/1953 Katz .......................... 252/186.33
4,595,643 A * 6/1986 Koshiba et al. ................ 429/403
(Continued)

FOREIGN PATENT DOCUMENTS

CN 1396308 * 2/2012 .............. C25B 11/16

OTHER PUBLICATIONS

"One step synthesis of carbon-supported Ag/MnyOx composites for oxygen reduction reaction in alkaline media," Qiwen Tang et al. Applied Catalysis B: Environmental 101 (2011), pp. 337-345.*
"A new air electrode based on carbon nanotubes and Ag—MnO2 for metal air electrochemical cells," Guo-Qing Zhang et al. Carbon 42 (2004), pp. 3097-3102.*

(Continued)

*Primary Examiner* — Patricia L Hailey
(74) *Attorney, Agent, or Firm* — Novick, Kim & Lee, PLLC; Allen Xue

(57) ABSTRACT

An Ag/$Mn_yO_x$/C catalyst is disclosed, wherein $Mn_yO_x$ is one of $Mn_3O_4$ and MnO, or the mixture of $Mn_3O_4$ and MnO, or the mixture of $Mn_3O_4$ and $MnO_2$ with the mass content of $MnO_2$ in the mixture of $Mn_3O_4$ and $MnO_2$ being 0.01-99.9%. The catalyst is obtained by pyrolyzing $AgMnO_4$ at a high temperature. The preparation method comprises two steps: (1) preparing $AgMnO_4$ crystal as the precursor; (2) preparing the Ag/$Mn_yO_x$/C catalyst. The catalyst has advantages such as high oxygen reduction reaction (ORR) catalytic activity in an alkaline environment, good stability, abundant availability and low cost of raw materials, safety, non-toxicity and pollution-free, environmental friendliness, and adaptive capacity for massive production. The catalyst can be used as oxygen reduction catalyst in metal air fuel cell, alkali anion exchange membrane fuel cell and other alkaline environments.

9 Claims, 4 Drawing Sheets

(51) Int. Cl.

| | | |
|---|---|---|
| *B01J 23/32* | (2006.01) | |
| *H01M 4/13* | (2010.01) | |
| *H01M 4/34* | (2006.01) | |
| *H01M 4/50* | (2010.01) | |
| *H01M 4/54* | (2006.01) | |
| *H01M 10/32* | (2006.01) | |
| *B01J 23/68* | (2006.01) | |
| *C25B 11/04* | (2006.01) | |
| *H01M 4/90* | (2006.01) | |
| *H01M 8/08* | (2006.01) | |
| *H01M 12/06* | (2006.01) | |

(56) References Cited

U.S. PATENT DOCUMENTS

| | | | | |
|---|---|---|---|---|
| 5,780,384 | A * | 7/1998 | Tomczak et al. | 502/324 |
| 6,632,557 | B1 * | 10/2003 | Curelop et al. | 429/405 |
| 7,041,414 | B2 * | 5/2006 | Thackeray et al. | 429/219 |
| 2013/0071761 | A1 * | 3/2013 | Amine et al. | 429/405 |

OTHER PUBLICATIONS

"Electrocatalytic activity and stability of Ag—MnOx/C composites toward oxygen reduction reaction in alkaline solution," Qiumei Wu et al. Electrochimica Acta 123 (2014), pp. 167-175.*

* cited by examiner

US 8,895,467 B2

AG/MNYOX/C CATALYST, PREPARATION AND APPLICATION THEREOF

FIELD OF THE INVENTION

This invention relates to an oxygen reduction reaction (ORR) catalyst in an alkaline environment, specifically an ORR catalyst used in metal air fuel cell, alkali anion exchange membrane fuel cell and other alkaline environments, preparation method and application thereof.

BACKGROUND OF THE INVENTION

With the increasing consumption of fuel, such as coal, oil and natural gas etc., and the increasing depletion of energy resources reserve, looking for sustainable and environment-friendly energy technologies is imminent. Fuel cells have become a research hotspot in the world because of the advantages of high energy conversion efficiency, no pollution and no noise, etc.

Fuel cell technology includes proton exchange membrane fuel cell, solid oxide fuel cell, metal-air fuel cell and alkaline anion exchange membrane fuel cell. In terms of the current technology of proton exchange membrane fuel cell, its further development is constrained by noble metal catalysts with high cost and limited resources; the solid oxide fuel cell needs to be conducted under high temperature conditions; metal-air fuel cell has the advantages of abundant fuel supply, long storage life, low noise and non-precious metal catalysts as ORR catalysts; compared with proton exchange membrane fuel cell, none fuel permeation exists in alkaline anion exchange membrane fuel cell, thus none electrode potential decline is caused; in addition, non-Pt catalysts can also be used as ORR catalysts in alkaline anion exchange membrane fuel cell.

Non-Pt ORR catalysts are studied and explored by researchers in recent years. It was reported in literature (Phys. Chem. Chem. Phys. 9 (2007) 2654.) that silver is reasonably highly active and stable toward the ORR in alkaline solutions. Product of Ag/C catalysts in the field of alkaline anion exchange membrane fuel cell does already exist, while the ORR over potential for Ag/C was about 50-100 mV higher than Pt/C catalysts (reported in J. Electrochem. Soc. 152 (2005) D117), indicating the catalytic activity of Ag/C remains to be improved. Manganese oxide ($Mn_xO_x$) with low cost is also a promising candidate for the ORR in alkaline media, while most ORRs on $Mn_xO_y$ undergo through a direct two-electron reduction process or a successive four-electron reduction process, resulting in a lower limiting current density.

According to the process in J. Phys. Chem. C 114 (2010) 4324, Ag/C is prepared by a method of two successive procedure: (1) reduction of $AgNO_3$ in water phase, during which sodium citrate is selected as protective agent and sodium borohydride as reducing agent; (2) addition of Vulcan XC-72R as catalyst supports.

CN1396308A discloses a manganese oxide composite ($MnO_2$—$Mn_3O_4$—$Mn_2O_3$) used as ORR catalysts in alkaline anion exchange membrane fuel cell and its preparation method thereof.

CN1266312C discloses an air electrode catalyst composed of manganese oxide ($MnO_2$—$Mn_3)_4/Mn_2O_3$) wherein $MnO_2$ is as the main catalyst, and $Mn_3O_4$ or $Mn_2O_3$ is as the assistant catalyst. $MnO_2$ is obtained by heat decomposition of manganese nitrate solution adsorbed on carbon support, while $Mn_3O_4$ or $Mn_2O_3$ powder should be added to carbon support prior to manganese nitrate decomposition.

According to the process in Carbon 42 (2004) 3097; (Ag+ $MnO_2$)/SWNT is obtained by reduction of silver permanganate solution ($AgMnO_4$) added with carbon nanotubes while hydrazine hydrate is as the reducing agent.

Comprehensive comparison of the above catalysts, the activity and stability of the catalysts and limiting current density of the battery still can't be satisfied simultaneously, which represents a further improvement is needed on the basis of the prior art.

SUMMARY OF THE INVENTION

For the deficiencies of the prior art, the present invention aims to provide an oxygen reduction reaction (ORR) catalyst used in metal air fuel cell, alkali anion exchange membrane fuel cell and other alkaline environments, and preparation and application thereof.

To achieve the objectives mentioned above, the present invention discloses the following embodiment.

A kind of $Ag/Mn_yO_x/C$ catalyst is disclosed, wherein $Mn_yO_x$ is one of $Mn_3O_4$ and MnO, or the mixture of $Mn_3O_4$ and MnO, or the mixture of $Mn_3O_4$ and $MnO_2$ with 0.01-99.9% mass content of $MnO_2$.

According to said catalyst wherein the percentage of total mass of Ag and $Mn_yO_x$ to $Ag/Mn_yO_x/C$ catalyst is 9.2-60%; and the molar ratio of Ag and $Mn_yO_x$ in $Ag/Mn_yO_x/C$ catalyst is 1:1-3:1.

A preparation method of said $Ag/Mn_yO_x/C$ catalyst, comprising the following steps, (1) Preparing $AgMnO_4$ crystal as the precursor:

a. a mixture of $AgNO_3$ and $KMnO_4$ is added to hot water of 70-100° C., and followed by stirring to form a uniform mixture, cooling to 0-5° C. to make $AgMnO_4$ crystals precipitated, washing the solid substance after filtration with deionized water of 0-5° C.;

b. a precursor, $AgMnO_4$ purple crystal, is obtained when said washed solid substance is dried naturally in a dark environment;

(2) Preparing the $Ag/Mn_yO_x/C$ catalyst:

a. said $AgMnO_4$ crystal precursor is dissolved in deionized water to form a solution;

b. carbon support with desired ratio is added to said solution from step (2) a to get a slurry, which is stirred until the carbon support is uniformly dispersed, and a black powder is obtained after drying;

c. said black powder obtained from step (2) b is placed in a container, which is heated with a heating rate of 1-10° C. $min^{-1}$ to the target temperature of 140-900° C. and kept at this temperature for 1-3 h in an inert gas atmosphere, to get said target $Ag/Mn_yO_x/C$ catalyst;

wherein the composition of said manganese oxide in $Ag/Mn_yO_x/C$ is different at different thermal treatment temperatures:

when said target temperature is 170-290° C., the target catalyst is $Ag/MnO_2/C$;

when said target temperature is >290-480° C., the target catalyst is $Ag/Mn_3O_4+MnO_2/C$;

when said target temperature is >480-650° C., the target catalyst is $Ag/Mn_3O_4+MnO/C$;

when said target temperature is >650-900° C., the target catalyst is Ag/MnO/C.

In said step (2) a, 23-138 mg $AgMnO_4$ crystal is added to each 100 ml of deionized water.

The molar ratio of said carbon powder added in said step (2) b and $AgMnO_4$ crystal added in said step (2) a is between 10.8:1 and 146.25:1.

The concentration of said AgNO$_3$ and KMnO$_4$ in hot water in said step (1) a is 0.027-0.108 g·mL$^{-1}$ and 0.025-0.1 g·mL$^{-1}$.

In said step (2) b, water in said slurry with carbon support is evaporated at the temperature between 50° C. and 80° C. to obtain said black powder.

Said carbon support is selected from XC-72R, BP2000, acetylene black, carbon nanotubes, graphite and mixtures thereof.

Said inert gas atmosphere is selected from nitrogen, argon, helium and mixtures thereof.

Said Ag/Mn$_y$O$_x$/C catalyst can be used as ORR catalyst in metal air fuel cell, alkali anion exchange membrane fuel cell and other alkaline environments.

Compared with conventional ORR catalyst used in alkaline media, said Ag/Mn$_y$O$_x$/C catalyst of this invention has apparent advantages as below:

1. In an alkaline environment, the ORR activity of Ag/Mn$_y$O$_x$/C catalyst of this invention is higher than that of commercialized Ag/C catalyst and Mn$_y$O$_x$ catalyst, and close to that of commercially available Pt/C catalyst.

2. In an alkaline environment, Ag/Mn$_y$O$_x$/C catalyst of this invention exhibits good stability, which is better than that of commercially-available Pt/C catalyst.

3. KMnO$_4$ required for preparing Ag/MnyOx/C catalyst of this invention is rich in resources and low in cost, which saves precious metals amount of Ag and reduce cost.

4. There is no toxic substance in the preparation process of Ag/MnyOx/C catalyst of this invention, which makes it a safe, pollution-free and environmental-friendly process.

5. Ag/Mn$_y$O$_x$/C catalyst of this invention is prepared by a method of silver permanganate pyrolysis at high temperatures, which is a simple and one step preparation process, and is advantageous for scaling up the production of this catalyst and the acceleration of its industrialization.

6. Ag/Mn$_y$O$_x$/C catalyst of this invention has a variety of applications, such as ORR catalyst in metal air fuel cell, alkali anion exchange membrane fuel cell and other alkaline environments etc.

EMBODIMENTS

Figure 1:
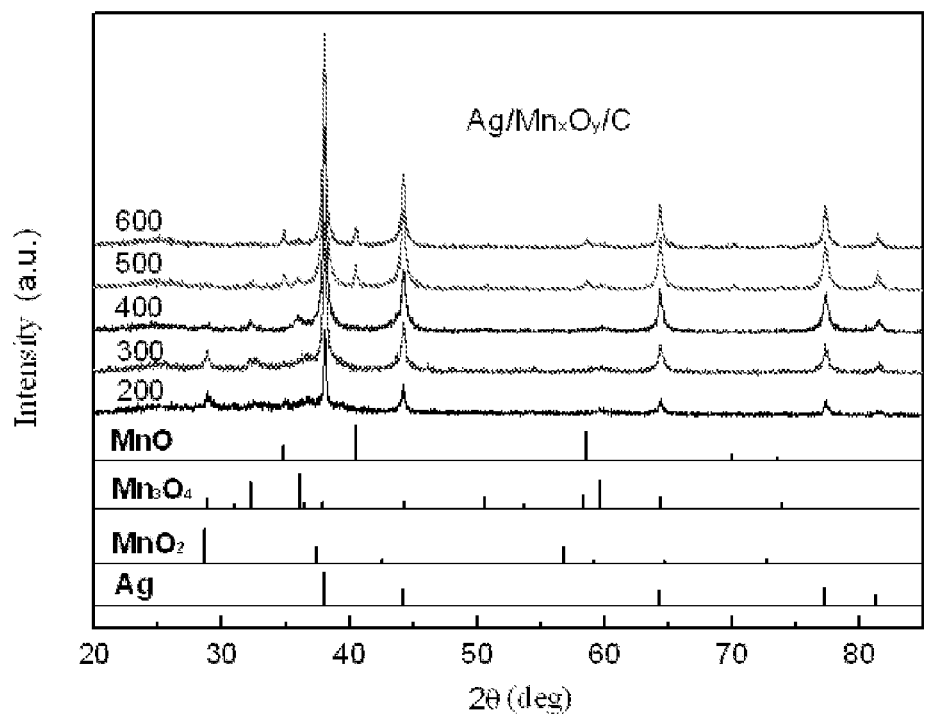
FIG. 1 shows X-ray diffraction (XRD) patterns of Ag/Mn$_y$O$_x$/C catalysts prepared in examples 1-5.

The present invention may be further illustrated by the following non-limiting examples.

EXAMPLE 1

A mixture of 1 g KMnO$_4$ and 1.075 g AgNO$_3$ with a molar ratio of 1:1 was added to 20 mL boiling water, and followed by naturally cooling to room temperature and then ice-water cooling to 2° C. to get purple crystals and a purple solution, washing the filtrated solid substance with cold water of 2° C. to remove the residual of K$^+$ and NO$_3^-$, thus purple crystals of AgMnO$_4$ was obtained by naturally dried in a dark environment.

The as-prepared silver permanganate (46.6 mg) was dissolved in 50 mL deionized (DI) water at room temperature, followed by adding 60 mg Vulcan XC-72R carbon black (Carbot, SBET=250 m$^2$·g$^{-1}$). The black slurry was ultrasonically stirred for 30 min and then immersed and mechanically stirred for 4 h at room temperature, followed by transferring to a water bath and maintained at 50° C. for several hours until the water was evaporated completely. The resulting black mixture of AgMnO$_4$/C was ground to powder and then transferred to a quartz boat which was placed in a tubular oven. Then the tubular oven was heated with a heating rate of 5° C.·min$^{-1}$ to 200° C. and kept at this temperature for 2 h in high-purity N$_2$ atmosphere. After that, the sample was cooled down to room temperature in high-purity N$_2$ atmosphere and the Ag/MnO$_2$/C was obtained.

EXAMPLES 2

First of all, 1 g KMnO$_4$ was added to 20 mL boiling water, then 1.075 g AgNO$_3$ crystals was added gradually to the above KMnO$_4$ solution. The molar ratio of KMnO$_4$ and AgNO$_3$ is 1:1. The obtained mixture solution was cooled naturally to room temperature and then cooled with iced-water to get purple crystals and a purple solution. The filtrated solid substance was washed with 200 mL cold water of 2° C. to remove residual K$^+$ and NO$_3^-$, thus purple crystals of AgMnO$_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black (Carbot, SBET=250 m$^2$·g$^{-1}$). The black slurry was ultrasonically stirred for 30 min and then immersed and mechanically stirred for 4 h at room temperature, followed by transferring to a water bath and maintained at 50° C. for several hours until the water was evaporated completely. The resulting black mixture of AgMnO$_4$/C was ground to powder and then transferred to a quartz boat which was placed in a tubular oven. Then the tubular oven was heated with a heating rate of 5° C.·min$^{-1}$ to an aimed temperature and kept at 300° C. for 2 h in high-purity N$_2$ atmosphere. After that, the sample was cooled down to room temperature in high-purity N$_2$ atmosphere and the Ag/MnO$_2$+Mn$_3$O$_4$/C was obtained.

EXAMPLES 3

First of all, 1 g KMnO$_4$ was added to 20 mL boiling water, then 1.075 g AgNO$_3$ crystals was added gradually to the above KMnO$_4$ solution. The molar ratio of KMnO$_4$ and AgNO$_3$ was 1:1. The obtained mixture solution was cooled naturally to room temperature and then cooled with iced-water to get purple crystals and a purple solution. The filtrated solid substance was washed with 200 mL cold water of 2° C. to remove residual k+ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° C.·min$^{-1}$ to 400° C. and kept at this temperature for 2 h in high-purity $N_2$ atmosphere. After that, the sample was cooled down to room temperature in high-purity $N_2$ atmosphere and the $Ag/Mn_3O_4/C$ was obtained.

EXAMPLES 4

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ was 1:1. The obtained mixture solution was cooled naturally to room temperature and then cooled with iced-water to get purple crystals and a purple solution. The filtrated solid substance was washed with 200 mL cold water of 2° C. to remove residual K+ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° C.·min$^{-1}$ to 500° C. and kept at this temperature for 2 h in high-purity $N_2$ atmosphere. After that, the sample was cooled down to room temperature in high-purity $N_2$ atmosphere and the $Ag/Mn_3O_4+MnO/C$ was obtained.

EXAMPLES 5

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ is 1:1. The obtained mixture solution was cooled naturally to room temperature and then cooled with iced-water to get purple crystals and a purple solution. The filtrated solid substance was washed with 200 mL cold water of 2° C. to remove residual K+ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° C.·min$^{-1}$ to 600° C. and kept at this temperature for 2 h in high-purity $N_2$ atmosphere. After that, the sample was cooled down to room temperature in high-purity $N_2$ atmosphere and the $Ag/Mn_3O_4+MnO/C$ was obtained.

EXAMPLES 6

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ was 1:1. The obtained mixture solution was cooled naturally to room temperature and then cooled with iced-water to get purple crystals and a purple solution. The filtrated solid substance was washed with 200 mL cold water of 2° C. to remove residual K+ and $NO_3^-$, thus purple crystals of $AgMnO_4$ was obtained by naturally dried in a dark environment.

The as-prepared certain amount of silver permanganate (69.9 mg) was dissolved in 50 mL deionized (DI) water at room temperature, followed by adding 40 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° C.·min$^{-1}$ to 400° C. and kept at this temperature for 2 h in high-purity $N_2$ atmosphere. After that, the sample was cooled down to room temperature in high-purity $N_2$ atmosphere and the $Ag/Mn_3O_4/C$ was obtained.

EXAMPLES 7

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ was 1:1. The obtained mixture solution was cooled naturally to room temperature and then cooled with iced-water to get purple crystals and a purple solution. The filtrated solid substance was washed with 200 mL cold water of 2° C. to removal residual K+ and $NO_3^-$, thus purple crystals of $AgMnO_4$ was obtained by naturally dried in a dark environment.

The as-prepared certain amount of silver permanganate (23.3 mg) was dissolved in 50 mL deionized (DI) water at room temperature, followed by adding 80 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° C.·min$^{-1}$ to 400° C. and kept at this temperature for 2 h in high-purity $N_2$ atmosphere. After that, the sample was cooled down to room temperature in high-purity $N_2$ atmosphere and the $Ag/Mn_3O_4/C$ was obtained.

EXAMPLES 8

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ is 1:1. The obtained mixture solution was cooled naturally to room temperature and then cooled with iced-water to get purple crystals and a purple solution. The filtrated solid substance was washed with 200 mL cold water of 2° C. to remove residual $K^+$ and $NO_3^-$, thus purple crystals of $AgMnO_4$ was obtained by naturally dried in a dark environment.

The as-prepared certain amount of silver permanganate (11.65 mg) was dissolved in 50 mL deionized (DI) water at room temperature, followed by adding 90 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° $C.\cdot min^{-1}$ to 400° C. and kept at this temperature for 2 h in high-purity $N_2$ atmosphere. After that, the sample was cooled down to room temperature in high-purity $N_2$ atmosphere and the $Ag/Mn_3O_4/C$ was obtained.

EXAMPLES 9

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ was 1:1. The obtained mixture solution was cooled naturally to room temperature and then cooled with iced-water to get purple crystals and a purple solution. The filtrated solid substance was washed with 200 mL cold water of 2° C. to remove residual $K^+$ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° $C.\cdot min^{-1}$ to 400° C. and kept at this temperature for 2 h in high-purity $N_2$ atmosphere. After that, the sample was cooled down to room temperature in high-purity $N_2$ atmosphere and the $Ag/Mn_3O_4/C$ was obtained.

EXAMPLES 10

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ was 1:1. The obtained mixture solution was cooled naturally to room temperature and then cooled with iced-water to get purple crystals and a purple solution. The filtrated solid substance was washed with 200 mL cold water of 2° C. to remove residual $K^+$ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° $C.\cdot min^{-1}$ to 400° C. and kept at this temperature for 3 h in high-purity $N_2$ atmosphere. After that, the sample was cooled down to room temperature in high-purity $N_2$ atmosphere and the $Ag/Mn_3O_4/C$ was obtained.

EXAMPLES 11

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ was 1:1. The obtained mixture solution was cooled naturally to room temperature and then cooled with iced-water to get purple crystals and a purple solution. The filtrated solid substance was washed with 200 mL cold water of 2° C. to remove residual $K^+$ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° $C.\cdot min^{-1}$ to 700° C. and kept at this temperature for 3 h in high-purity $N_2$ atmosphere. After that, the sample was cooled down to room temperature in high-purity $N_2$ atmosphere and the $Ag/MnO/C$ was obtained.

EXAMPLES 12

First of all, 1 g $KMnO_4$ was added to 20 mL boiling water, then 1.075 g $AgNO_3$ crystals was added gradually to the above $KMnO_4$ solution. The molar ratio of $KMnO_4$ and $AgNO_3$ is 1:1. The obtained mixture solution was cooled naturally to room temperature and then cooled with iced-water to get purple crystals and a purple solution. The filtrated solid substance was washed with 200 mL cold water of 2° C. to remove residual $K^+$ and $NO_3^-$, thus purple crystals of $AgMnO_4$ was obtained by naturally dried in a dark environment.

The as-prepared certain amount of silver permanganate (46.6 mg) was dissolved in 50 mL deionized (DI) water at room temperature, followed by adding 60 mg Vulcan XC-72R carbon black. The black slurry was ultrasonically stirred for 30 min and then immersed and mechanically stirred for 4 h at room temperature, followed by transferring to a water bath and maintained at 50° C. for several hours until the water was evaporated completely. The resulting black mixture of $AgMnO_4/C$ was ground to powder and then transferred to a quartz boat which was placed in a tubular oven. Then the tubular oven was heated with a heating rate of 5° $C.\cdot min^{-1}$ to 900° C. and kept at this temperature for 3 h in high-purity $N_2$ atmosphere. After that, the sample was cooled down to room temperature in high-purity $N_2$ atmosphere and the Ag/MnO/C was obtained.

Comparative Example 1

Ag/C

First of all, 559 mg sodium citrate and 69.3 mg $AgNO_3$ were dissolved in 50 mL deionized (DI) water, followed by gradually adding of sodium borohydride aqueous solution with a concentration of 7.4 mM under stirring. Then 156 mg Vulcan XC-72R, which was ultrasonic dispersed uniformly in advance, was mixed to the above solution. The target product of 22% Ag/C was obtained through filtrating and washing the obtained solution after a precipitation process of 8 h, followed by drying for 8 h under vacuum conditions at 70° C.

Comparative Example 2

$Mn_3O_4$/C

First of all, 168 mg Vulcan XC-72R carbon black was ultrasonically dispersed in 100 mL ethanol aqueous solution with a volume concentration of 20%, followed by adding 151 mg manganous nitrate aqueous solution with a mass concentration of 50%. The obtained solution was mechanically stirred under immersion for 4 h at room temperature. Then solution was removed by rotary evaporator to obtain black powder of $Mn(NO_3)_2$/C, which was ground to powder and then transferred to a quartz boat placed in a tubular oven. Before heating, continuous high-purity $N_2$ atmosphere flowed through the quartz tube for about 15 min to replace the air in the oven. Then the tubular oven was heated with a heating rate of 5° C.·$min^{-1}$ to 400° C. and kept at this temperature for 2 h in high-purity $N_2$ atmosphere. Thus the aimed catalyst of $Mn_3O_4$/C was obtained.

Comparative Example 3

Ag/C and $Mn_3O_4$/C Mixed Mechanically

44% Ag/C and 32% $Mn_3O_4$/C with a mass ratio of 1:1 was mechanically mixed to get a comparative catalyst of Ag+$Mn_3O_4$/C, wherein the loading of Ag and $Mn_3O_4$ are 22% and 16%, respectively.

Comparative Example 4

20 wt. % Pt/C (E-TEK Corporation) was selected for comparison.

FIG. 1 shows X-ray diffraction (XRD) patterns of Ag/$Mn_yO_x$/C catalysts prepared in examples 1-5. For all catalysts, the diffraction peaks located at 38.0°, 44.2°, 64.4°, 77.3° and 81.5° are attributed to the (1 1 1), (2 0 0), (2 2 0), (3 1 1) and (2 2 2) crystal facets of Ag, respectively. In addition, from the XRD patterns, we can see that the main manganese oxide phase is $MnO_2$ in example 1, mixture of $MnO_2$ and $Mn_3O_4$ in example 2, $Mn_3O_4$ in example 3 and MnO in examples 4 and 5. The average crystalline size of Ag for the Ag/$Mn_yO_x$/C composites, calculated by Scherrer's formula, is 21.2, 20.7, 22.0, 22.3 and 25.3 nm, respectively.

Figure 2:
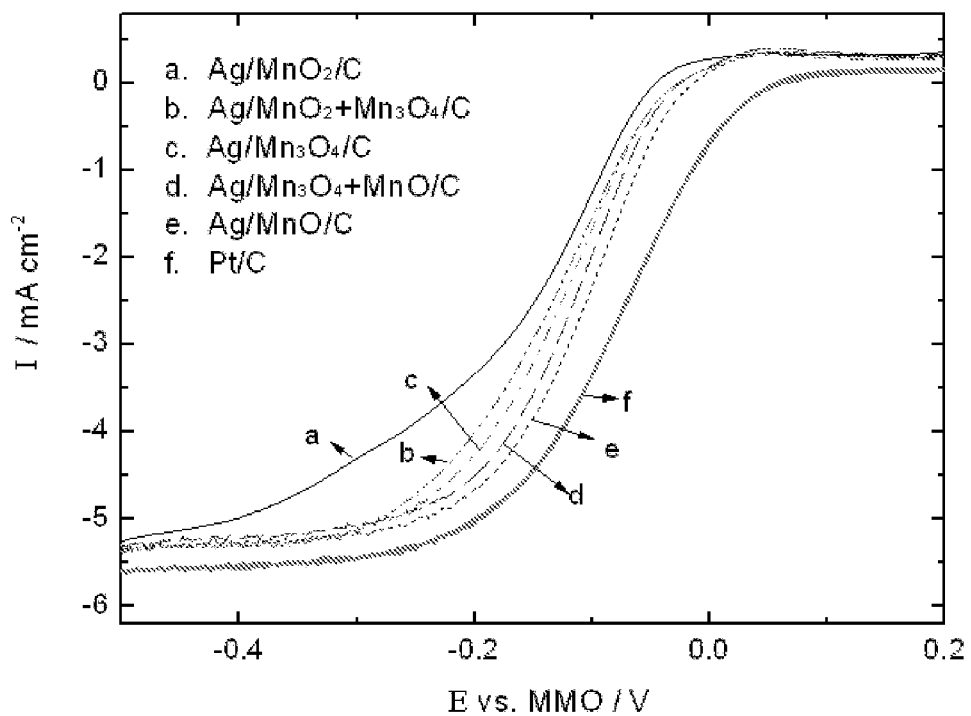
FIG. 2 shows the comparison of ORR curves on the Ag/Mn$_y$O$_x$/C catalysts prepared in examples 1-5 and 20% Pt/C in comparative example 4 in a 0.1M NaOH solution saturated with O$_2$.

FIG. 2 shows the comparison of ORR curves on the Ag/$Mn_yO_x$/C catalysts prepared in examples 1-5 and in comparative example 4 in a 0.1M NaOH solution saturated with $O_2$. From FIG. 2, we can see that the order of ORR activities of Ag/$Mn_xO_y$/C prepared in examples 1-5 with different thermal treatment temperature is that of Ag/$Mn_xO_y$/C-400>300>500>600>200. In view of both of the Ag content and the particle size of the obtained catalysts are similar in examples 1-5, the activity difference can be attributed to the different composition of manganese oxide in Ag/$Mn_yO_x$/C catalysts. The Ag/$Mn_3O_4$/C shows the most positive half-wave potential among all the Ag/$Mn_yO_x$/C composites. It should be noted that the difference in half-wave potential of the ORR between the Ag/$Mn_3O_4$/C in example 3 and in comparative example 4 is minimized to 31 mV from the reported values of around 50-100 mV between Ag/C and Pt/C [J. Electrochem. Soc. 152 (2005) D117]. This confirms that the addition of $Mn_yO_x$ to Ag significantly enhances its ORR activity.

Figure 3:
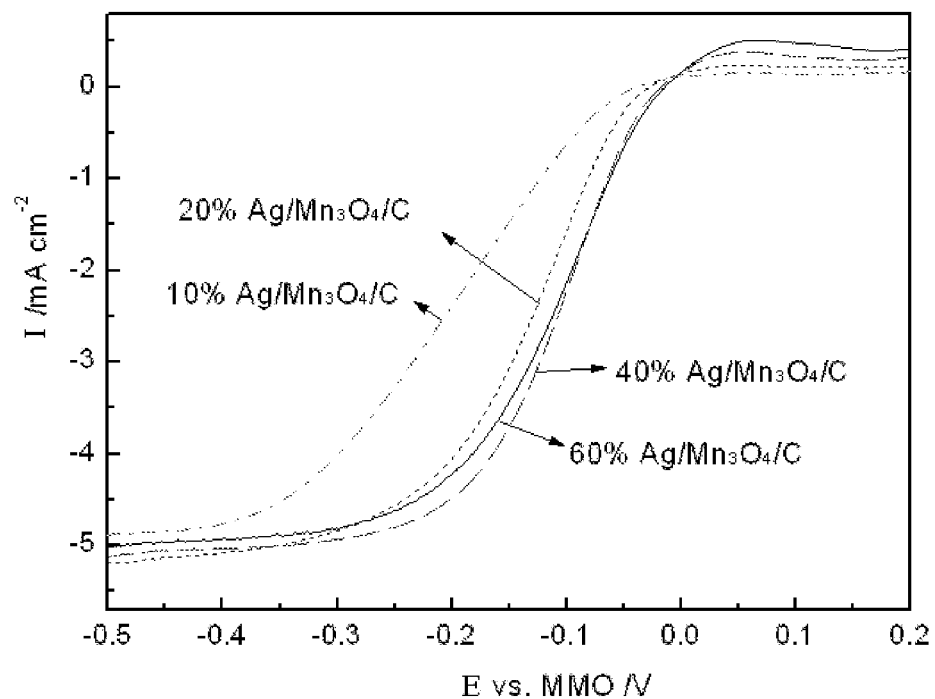
FIG. 3 shows the comparison of ORR curves on the Ag/Mn$_3$O$_4$/C catalysts prepared in examples 3, 6-8 in a 0.1M NaOH solution saturated with O$_2$.

FIG. 3 shows the comparison of ORR curves on the Ag/$Mn_3O_4$/C catalysts prepared in examples 3, 6-8 in a 0.1M NaOH solution saturated with $O_2$. From FIG. 3, we can see that the order of ORR activities of Ag/$Mn_3O_4$/C with different loadings of Ag/$Mn_3O_4$ is that of 40%>60%>20%>10%.

Figure 4:
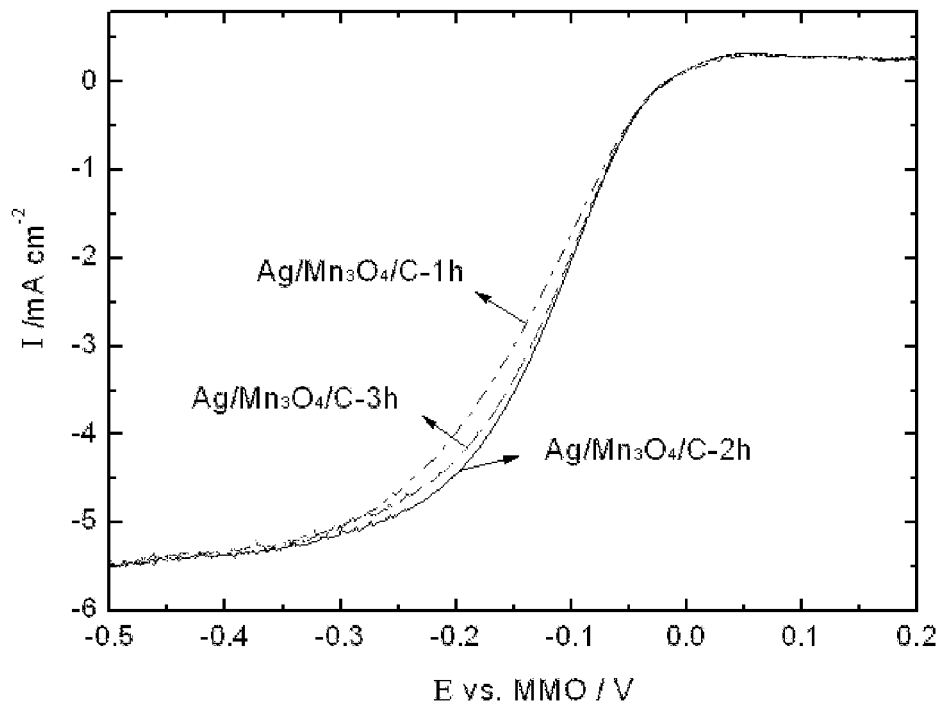
FIG. 4 shows the comparison of ORR curves on the Ag/Mn$_3$O$_4$/C catalysts prepared in examples 3, 9, and 10 in a 0.1M NaOH solution saturated with O$_2$.

FIG. 4 shows the comparison of ORR curves on the Ag/$Mn_3O_4$/C catalysts prepared in examples 3, 9, 10 in a 0.1M NaOH solution saturated with $O_2$. From FIG. 4, we can see that the ORR activity of Ag/$Mn_3O_4$/C heat-treated with 2 h in example 3 is a little better than that of Ag/$Mn_3O_4$/C heat-treated with 1 h or 3 h in examples 9 and 10.

Figure 5:
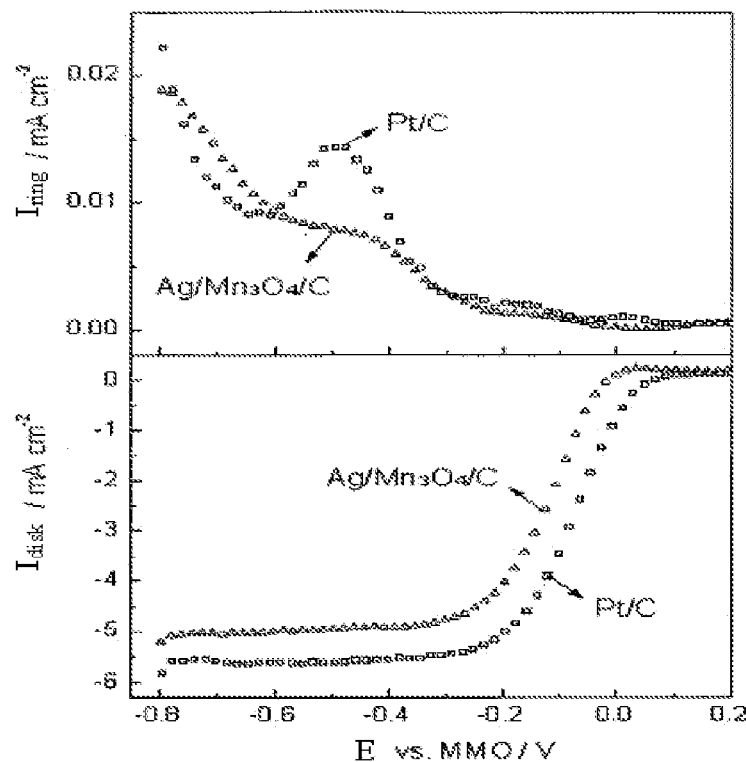
FIG. 5 shows test results of RRDE on the Ag/Mn$_3$O$_4$/C catalysts prepared in example 3 and 20% Pt/C in comparative example 4.

FIG. 5 (a) The ring current densities, (b) the disk current densities, during the RRDE measurements of the ORR on the Ag/$Mn_3O_4$/C catalysts prepared in example 3 and in comparative example 4. For both catalysts of Ag/$Mn_3O_4$/C and Pt/C, the ring current densities are negligible (the maximum value is 0.02 mA·$cm^{-2}$), that's to say a small amount of $H_2O_2$ is generated during the reaction and it can also be negligible. It can be seen that the ORR selectivity on Ag/$Mn_3O_4$/C to water is much higher. In the diffusion-controlled region where the potential is −0.6 V, $H_2O_2$ yield is only 0.98% and the electron exchange number is about 3.98 on the Ag/$Mn_3O_4$/C.

Figure 6:
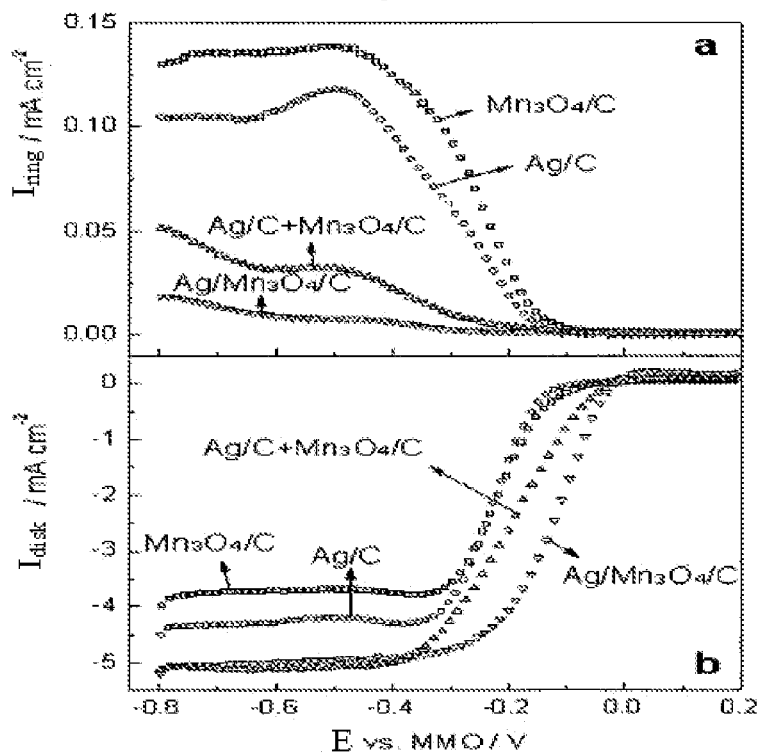
FIG. 6 shows the comparison of ORR curves on the Ag/Mn$_3$O$_4$/C catalysts prepared in example 3 and catalysts prepared in comparative example 1-3 in a 0.1M NaOH solution saturated with O$_2$.

FIG. 6 shows the comparison of ORR curves on the Ag/$Mn_3O_4$/C catalysts prepared in example 3 and catalysts prepared in comparative example 1-3 in a 0.1M NaOH solution saturated with $O_2$. From the figure it can be seen that the order of ORR activity of the samples prepared is that Ag/$Mn_3O_4$/C>Ag+$Mn_3O_4$/C>Ag/C>$Mn_3O_4$/C, which further demonstrates the Ag/$Mn_3O_4$/C prepared by said one step synthesis method has a better ORR activity than that of Ag+$Mn_3O_4$/C prepared by mechanically mixing when they have same loading of Ag and $Mn_3O_4$. The improved performance of Ag/$Mn_3O_4$/C could be attributed to the probable existence of an internal action between Ag and $Mn_3O_4$.

Figure 7:
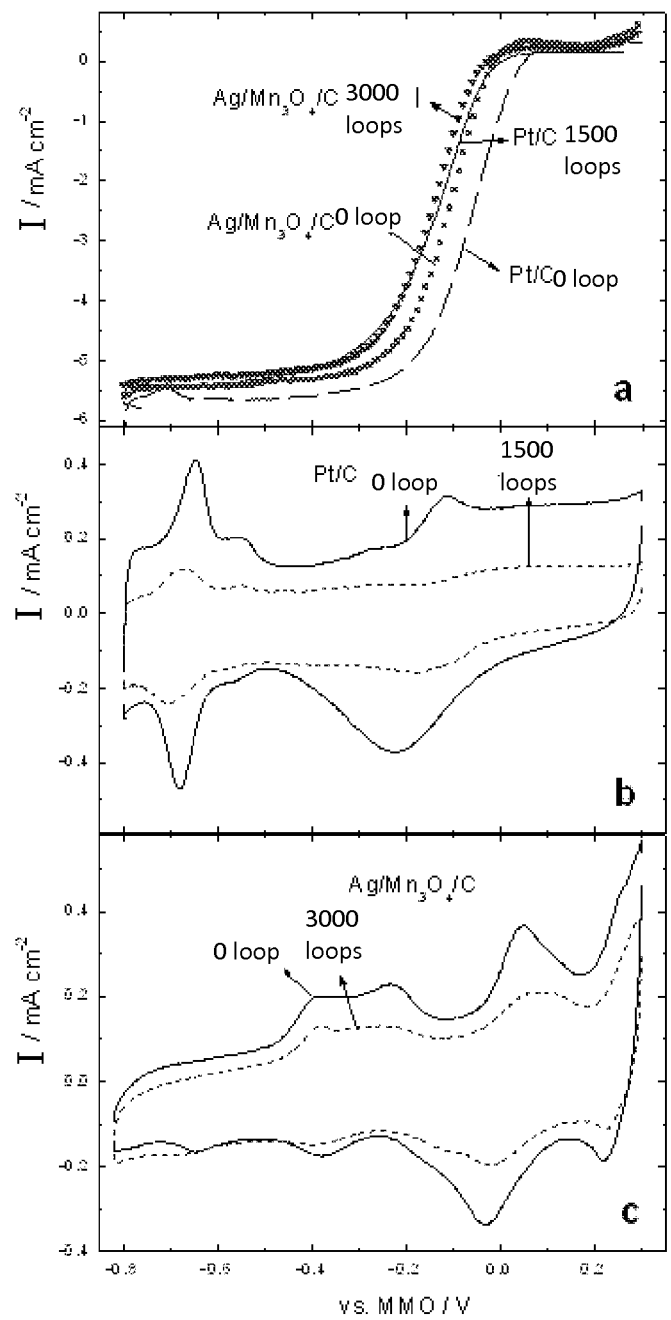
FIG. 7 shows the comparison of (a) ORR curves and base CVs on the Ag/Mn$_3$O$_4$/C catalyst prepared in example 3 and 20% Pt/C in comparative example 4 in a N$_2$-saturated 0.1M NaOH solution before and after accelerated aging tests.

FIG. 7 shows the comparison of (a) ORR curves on the Ag/$Mn_3O_4$/C catalyst prepared in example 3 and in comparative example 4 before and after accelerated aging tests; (b) base CVs of 20% Pt/C in comparative example 4 in a $N_2$-saturated 0.1M NaOH solution before and after accelerated aging tests; (c) base CVs of Ag/$Mn_3O_4$/C catalyst prepared in example 3 in a $N_2$-saturated 0.1M NaOH solution before and after accelerated aging tests. It can be seen that for both catalysts, the activities toward the ORR and base CV decrease gradually with increasing scanning cycles, and the degradation in activity of Pt/C is apparently faster than the Ag/$Mn_3O_4$/C during the accelerated aging tests, which indicates that a better stability of Ag/$Mn_3O_4$/C can be obtained under the test conditions compared with Pt/C.

We claim:

1. A silver-containing catalyst of general formula Ag/$Mn_yO_x$/C, comprising: Ag, $MnO_yO_x$, and a carbon support, wherein $MnO_yO_x$ is selected from the group consisting of $Mn_3O_4$, MnO, $MnO_2$, and mixtures thereof, wherein a total weight of Ag and $Mn_yO_x$ is 9.2-60% of a total weight of the silver-containing catalyst, wherein a molar ratio of Ag and $Mn_yO_x$ ranges from 1:1 to 3:1.

2. A preparation method of the silver-containing catalyst of claim 1, comprising the following steps:
(1) preparing $AgMnO_4$ crystal as the precursor:
a. adding a mixture of $AgNO_3$ and $KMnO_4$ to hot water of 70-100° C., stirring to form a uniform mixture, cooling to 0-5° C. to make $AgMnO_4$ crystals precipitated, washing the solid substance after filtration with cold water of 0-5° C.;
b. a precursor, $AgMnO_4$ purple crystal, is obtained when said washed solid substance is dried naturally in a dark environment;
(2) preparing a $Ag/Mn_yO_x/C$ catalyst:
a. dissolving said precursor $AgMnO_4$ crystal in deionized water to form a solution;
b. adding a carbon support to said solution from step (2) a to get a slurry, and drying the slurry to obtain a black powder;
c. placing said black powder obtained from step (2) b in a container, which is heated at a heating rate of 1-10° $C.\cdot min^{-1}$ to a target temperature of 140-900° C. and maintaining said black powder at temperature for 1-3 h in an inert gas atmosphere to obtain the Ag/MnyOx/C catalyst,
wherein when said target temperature is 170-290° C., the Ag/MnyOx/C catalyst is $Ag/MnO_2/C$;
when said target temperature is 290-480° C., the Ag/MnyOx/C catalyst is $Ag/Mn_3O_4+MnO_2/C$;
when said target temperature is 480-650° C., the Ag/MnyOx/C catalyst is $Ag/Mn_3O_4+MnO/C$;
when said target temperature is 650-900° C., the Ag/MnyOx/C catalyst is Ag/MnO/C.

3. The preparation method of claim 2, wherein 23-138 mg $AgMnO_4$ crystal is added to each 100 ml of deionized water in said step (2)a.

4. The preparation method of claim 2, wherein, in said step (2)b, a molar ratio of said carbon support added in said step (2)b and said $AgMnO_4$ crystal added in said step (2)a is between 10.8:1 and 146.25:1.

5. The preparation method of claim 2, wherein the concentration of said $AgNO_3$ and $KMnO_4$ in hot water in said step (1)a is 0.027-0.108 $g\cdot mL^{-1}$ and 0.025-0.1 $g\cdot mL^{-1}$, respectively.

6. The preparation method of claim 2, wherein the slurry is dried at the temperature between 50° C. and 80° C. in said step (2)b.

7. The preparation method of claim 2, wherein said carbon support is selected from carbon black, acetylene black, carbon nanotubes, graphite and mixtures thereof; and said inert gas atmosphere is selected from nitrogen, argon, helium and mixtures thereof.

8. A method of using a silver-containing catalyst of general formula $Ag/Mn_yO_x/C$, comprising:
preparing a silver-containing catalyst of claim 1; and
applying the silver-containing catalyst as an oxygen reduction reaction catalyst in a fuel cell.

9. The method of claim 8, wherein the fuel cell is a metal air fuel cell or an alkali anion exchange membrane fuel cell.

* * * * *